(12) United States Patent
Wang et al.

(10) Patent No.: US 10,675,671 B2
(45) Date of Patent: Jun. 9, 2020

(54) BLIND FLOW SCREW JOINING OF MATERIALS

(71) Applicant: GM GLOBAL TECHNOLOGY OPERATIONS LLC, Detroit, MI (US)

(72) Inventors: Pei-Chung Wang, Troy, MI (US); Steven Cipriano, Chesterfield Township, MI (US); Bradley J. Blaski, Sterling Heights, MI (US); Richard C. Janis, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 15/488,233

(22) Filed: Apr. 14, 2017

(65) Prior Publication Data

US 2018/0214934 A1 Aug. 2, 2018

Related U.S. Application Data

(60) Provisional application No. 62/451,933, filed on Jan. 30, 2017.

(51) Int. Cl.
*B21J 15/02* (2006.01)
*F16B 13/02* (2006.01)
(Continued)

(52) U.S. Cl.
CPC ........... *B21J 15/027* (2013.01); *B21J 15/043* (2013.01); *B21J 15/147* (2013.01); *F16B 13/02* (2013.01);
(Continued)

(58) Field of Classification Search
CPC .. F16B 19/1045; F16B 19/1054; F16B 13/02; F16B 19/1072; F16B 25/0031; B21J 15/027; B21J 15/147; B21J 15/04
(Continued)

(56) References Cited

U.S. PATENT DOCUMENTS 2,408,559 A * 10/1946 Keating .............. F16B 19/1054
411/17
3,763,541 A * 10/1973 Jaffe ...................... B21J 15/043
72/393
(Continued)

FOREIGN PATENT DOCUMENTS

| CN | 1784551 A | 6/2006 |
|---|---|---|
| CN | 102203436 A | 9/2011 |
| CN | 106065893 A | 11/2016 |

OTHER PUBLICATIONS

John Sprovieri; Flow-Drilling Screws Help Carmakers Shed Weight; article Assembly magazine; Feb. 1, 2016.

*Primary Examiner* — Sarang Afzali
*Assistant Examiner* — Darrell C Ford
(74) *Attorney, Agent, or Firm* — Reising Ethington P.C.

(57) ABSTRACT

A two-part mechanical fastener comprising an elongated body with a bore slidably carrying a mandrel adapted to interferingly engage the body is described. The fastener body has one or more protuberances on its exterior surface. In an aspect, the protuberances form a thread. The fastener is adapted to form an opening in, and penetrate, a stack of two or more workpieces. To secure the workpieces in the workpiece stack and form a robust joint, the fastener body is deformed by the mandrel, expanding the body, so that a body end engages a surface of the workpiece stack and the one or more protuberances are brought into engagement with the walls of the opening. Methods of using such a fastener to secure non-ferrous or polymer-based sheet-like workpieces to one another are disclosed.

7 Claims, 5 Drawing Sheets

(51) Int. Cl.
*F16B 19/10* (2006.01)
*B21J 15/04* (2006.01)
*B21J 15/14* (2006.01)
*F16B 25/00* (2006.01)

(52) U.S. Cl.
CPC ...... *F16B 19/1054* (2013.01); *F16B 19/1072* (2013.01); *F16B 25/0031* (2013.01)

(58) Field of Classification Search
USPC .......................................................... 411/43
See application file for complete search history.

(56) References Cited

U.S. PATENT DOCUMENTS

| | | | | |
|---|---|---|---|---|
| 4,642,010 A | * | 2/1987 | Bradley | ................ B21J 15/043 411/334 |
| 4,781,500 A | * | 11/1988 | Mauer | ................ F16B 19/1054 411/36 |
| 4,920,833 A | * | 5/1990 | Rosenthal | ........... B25B 27/0014 411/29 |
| 4,990,042 A | * | 2/1991 | Szayer | ................ F16B 19/083 411/29 |
| 6,254,324 B1 | * | 7/2001 | Smith | ................ F16B 19/1045 411/34 |
| 7,503,106 B2 | * | 3/2009 | Crutchley | .............. B21J 15/043 29/525.11 |
| 7,862,271 B2 | | 1/2011 | Wang et al. | |
| 8,721,241 B2 | | 5/2014 | Jokisch | |
| 2002/0119024 A1 | * | 8/2002 | Jennings | ............. F16B 19/1054 411/38 |
| 2002/0127080 A1 | * | 9/2002 | Aasgaard | ............... B21J 15/048 411/29 |
| 2003/0123949 A1 | * | 7/2003 | Eshraghi | ................. F16B 19/10 411/71 |
| 2005/0155212 A1 | * | 7/2005 | Crutchley | .............. B21J 15/043 29/524.1 |
| 2006/0112525 A1 | * | 6/2006 | Castellote | ............... B23P 9/025 24/453 |
| 2011/0164945 A1 | * | 7/2011 | Lathabai | ................. B21J 5/066 411/501 |
| 2014/0314513 A1 | * | 10/2014 | Saltenberger | ....... F16B 19/1054 411/34 |

* cited by examiner

FIG. 18

BLIND FLOW SCREW JOINING OF MATERIALS

CROSS-REFERENCE TO RELATED APPLICATION(S)

This application claims the benefit of U.S. Provisional Application No. 62/451,933, filed Jan. 30, 2017, entitled "Blind Flow Screw Joining of Materials," which is herein incorporated by reference in its entirety.

TECHNICAL FIELD

The technical field of this disclosure pertains to mechanical fasteners and methods of using such fasteners to secure two or more layers of materials, which may be similar or dissimilar in structure and/or composition, to one another.

INTRODUCTION

Motor vehicles, including automobiles and light trucks, employ a wide variety of materials including sheet steels ranging in tensile strength from around 300 MPa to over 800 MPa, non-ferrous alloys such as cast and wrought aluminum and magnesium alloys, and polymers, including reinforced polymers. A vehicle body or structure results from the assembly of many parts and components robustly secured to one another and arranged so that the assembled components may mutually cooperate to accommodate the loads applied to the body or structure. The wide range of potential materials which may require attachment makes mechanical fasteners an attractive option since mechanical fasteners may be adapted to mutually join and secure a plurality of components fabricated of a wide range of materials, whether of like, similar, or dissimilar materials.

SUMMARY

A two-part fastener, each part being fabricated of a ferrous material, for forming a structural joint between two or more layered workpieces is disclosed. Suitable workpieces include cast and wrought aluminum and magnesium alloys, and polymer-based workpieces such as filled polymers and polymers reinforced with particles and fibers, including woven fibers.

The fastener comprises a hollow, elongated, cylindrical or conical body with an axis of rotation. The fastener body has a length, first and opposing ends, a bore of generally uniform internal diameter, and an external surface. The fastener body terminates at the first end in an annular cap with an inner diameter equal to the diameter of the body bore and an outer diameter sized to overhang the external surface of the body.

The external surface of the body may have one or more outwardly-extending, protuberant features, circumscribable by a circle centered on the body axis, and with a diameter less than the outer diameter of the annular cap. The fastener may also have a mandrel, positioned in the body bore, with shaft sized to slidably engage the bore and, at an end, protruding from the bore, a mandrel head sized to interferingly engage the fastener body opposing end. The fastener may be rotated about the axis of rotation. The mandrel head may be adapted, when a rotating fastener is brought into contact with a workpiece, to frictionally engage and heat the workpiece, or, to cut and mechanically remove workpiece material.

In an aspect, the protuberances may be a thread. In other aspects, the protuberances may be continuous or segmented ridges, or isolated, like-dimensioned or variously-dimensioned isolated features.

The above-described fastener may be used to join together two or more workpieces assembled into a clamped workpiece stack by rotating the fastener about the fastener rotation axis while advancing the fastener toward the upper surface of the upper workpiece of the workpiece stack at a joint area. The rotating fastener is advanced into initial engagement with the surface of the workpieces stack and may, optionally, be maintained in contact with the workpiece surface, while rotating, for a time sufficient to frictionally heat the workpiece. The rotating fastener is then further advanced into the workpiece stack until the opposing end of the fastener penetrates and extends beyond the lower workpiece external surface and the underside of the fastener cap contacts the external surface of the upper workpiece. When this occurs, both rotation and advancement of the fastener are discontinued.

Then a continually increasing force is applied to the mandrel along the fastener axis in a direction which promotes engagement of the mandrel head and the body opposing end while supporting the body of the fastener so that the mandrel head interferes with the body end and deforms and collapses the body end until the mandrel shaft fractures, thereby securing together the workpieces.

In an embodiment, the joining process may be practiced while preheating the workpiece stack using resistance heating, induction heating or laser heating.

DETAILED DESCRIPTION

Figure 1:
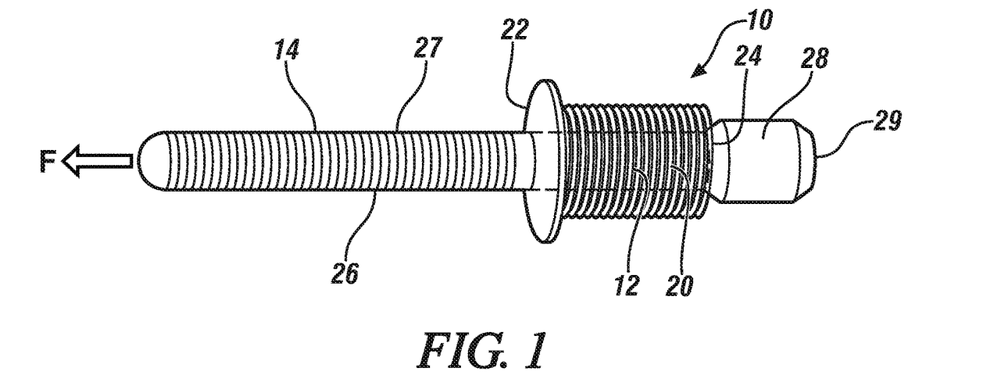
FIG. 1 is a representative embodiment of a first aspect of a fastener which has an externally threaded body and a mandrel with a head which is smaller than the minor thread diameter.
Figure 2:
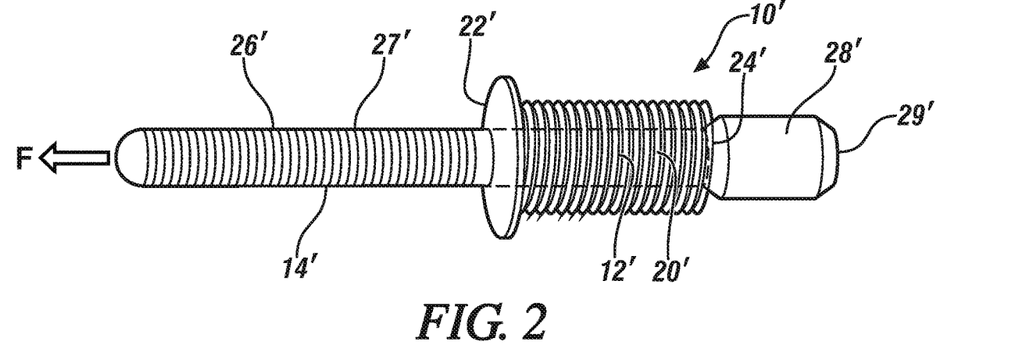
FIG. 2 is another representative embodiment of a first aspect of a fastener which has an externally threaded body and a mandrel with a head which is smaller than the minor thread diameter.
Figure 3:
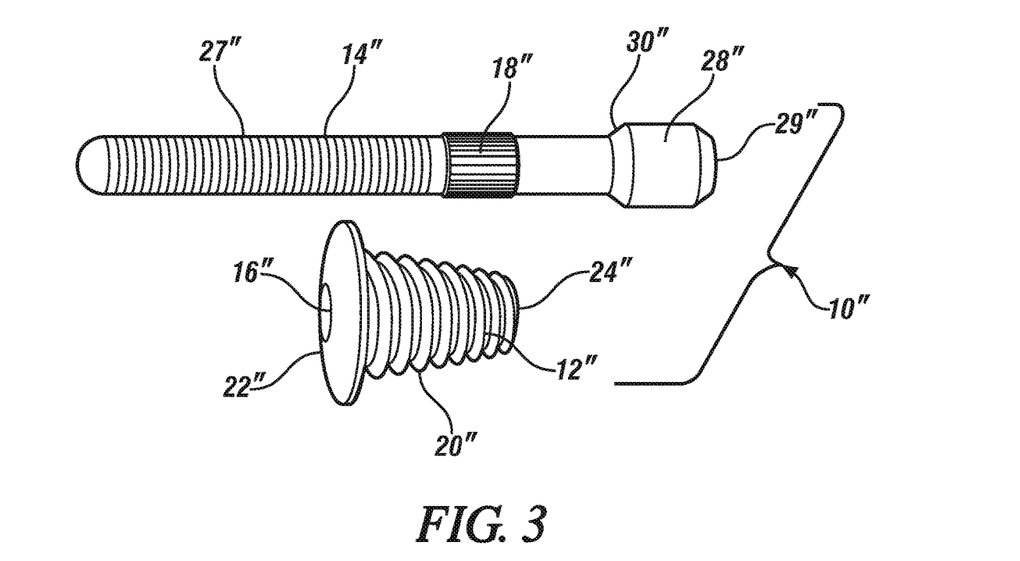
FIG. 3 shows a disassembled embodiment of a threaded fastener like those shown in FIGS. 1 and 2.
Figure 4:
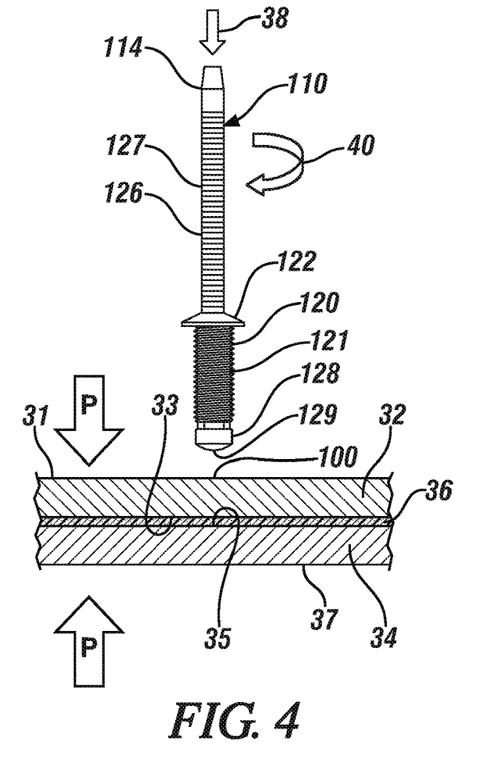
FIG. 4 illustrates a process of using the fastener of FIGS. 1, 2, and 3 to join together a workpiece stack consisting of two overlying members with adhesive applied at the faying interface.

Exemplary two-part externally-threaded fasteners, illustrative of a first aspect, 10, 10' are shown at FIGS. 1 and 2, and in disassembled form, 10" at FIG. 3.

Referring first to FIG. 3. Fastener 10" comprises a body 12" and a mandrel 14" comprising a mandrel shaft 27" and a mandrel head 28". Mandrel shaft 27" slidingly engages bore 16" in body 12". When assembled into fasteners 10, 10' (FIGS. 1, 2) mandrels 14, 14' may be temporarily secured against relative sliding or inhibited against relative rotational motion with body 12, 12' by the elongated bore-engaging features 18" shown at FIG. 3. Bodies 12, 12', 12" have external threads 20, 20', 20" with a major diameter ranging from 2 mm to 10 mm and a crest to root dimension ranging from 0.3 mm to 2.5 mm and extending from an annular cap 22, 22', 22", located at an end of bodies 12, 12', 12", to an opposing body end 24, 24', 24". Bodies 12, 12', 12" may have a generally conical outer surface tapering from the annular cap end to the opposing end such as is shown at body 12" or have a generally cylindrical outer surface as shown at bodies 12, 12'. Suitably, the annular cap, 22 for example, may have an outer diameter 2-5 times the diameter of the body at the location immediately adjacent to the cap.

The thread pitch on bodies 12, 12', 12" may be coarse, as in fastener 10" or fine as in fastener 10 or of intermediate pitch as in fastener 10'. Although the examples shown display a fixed thread pitch along the body length, a variable pitch thread may also be employed. Suitable thread pitches include 0.2 mm-4 mm. Many thread variants are known to those in the fastener arts including, without limitation, UNC, UNF, BSW, BSF, metric, and BA. Bodies 12, 12', 12" may incorporate any of these thread types as well as other, non-standard, or non-recognized, thread variants.

Bodies 12, 12' 12" may be of any suitable length provided it is sufficient to penetrate and extend through a stacked arrangement of workpieces, each generally in sheet form, as described further below.

Mandrels 14, 14', 14" are generally appreciably longer than the bodies they occupy, with shafts 27, 27', 27" encompassing most of their length. Shafts 27, 27', 27" may have engagable features, such as 26 on shaft 27 (see FIG. 1) and 26' on shaft 27' (FIG. 2), which permit reliably transmitting a pulling or tensile force (F- see FIGS. 1, 2) directed to extract the mandrel from the body. Mandrel shafts 27, 27', 27" are of generally uniform, bore-slidable cross-section, terminating in a mandrel head 28, 28', 28" with a cross-sectional dimension greater than the dimensions of respective bores 16, 16', 16", so that, on application of pulling force 'F' (FIGS. 1, 2) mandrels 28, 28', 28" interfere with the opposing body ends 24, 24', 24" of their respective bodies 12, 12', 12".

The bores shown, 16, 16', 16" are cylindrical and sized to accept corresponding cylindrical mandrel shafts 27, 27', 27". It will be appreciated however that bores and shafts may exhibit alternative cross-sections, including polygonal, oval, and star-shaped, provided they are complementary in shape, and sized so that they may slidingly engage. Other-than-cylindrical bore and shaft cross-sections may interferingly rotationally engage, obviating the need for features such as the shaft protrusions 18" shown at FIG. 3 and intended to inhibit relative rotational motion of the mandrel and body.

Each of mandrel heads 28, 28', 28" is shaped as a cylinder with a flattened end 29, 29', 29" but, as described more fully below, multiple shapes may be employed. In the example shown in FIG. 3, the taper 30" serves to smoothly transition the mandrel head diameter 28" to the shaft diameter 27". On application of a force 'F', such as shown at FIGS. 1, 2, the mandrel head serves to progressively and uniformly expand bore 16" at the opposing end 24" to splay opposing end 24" and increase its diameter as the mandrel head is progressively advanced into the bore 16".

The use of such a fastener is illustrated in FIGS. 4, 5, 6, 7, and 8. At FIG. 4 a two-layer stack of sheet workpieces 32 and 34, optionally with adhesive 36 disposed at their faying surfaces 33, 35, is clamped tightly together under opposing clamping pressures P suitably distributed to bring the workpiece faying surfaces 33, 35 into contact at least at joint zone 100. Fastener 110, substantially the same as the fastener shown at FIG. 1, although with coarser threads 121 on body 120 and with a more rounded mandrel head end 129, is secured, at least at mandrel shaft 114, in a machine (not shown) capable of both rotational and longitudinal motion. The machine may have a gripping device such as a chuck or a collet adapted to engage with engagable features 126 of shaft 127 of mandrel 114 and may also engage annular cap 122, either frictionally or mechanically (not shown), to securely retain fastener 110. The machine then rotates the fastener in a direction 40 while simultaneously advancing the fastener in a direction 38 to urge the now-rotating fastener toward joint zone 100 where surface 129 of mandrel head 128 engages surface 31 of workpiece 32 at joint zone 100.

Figure 5:
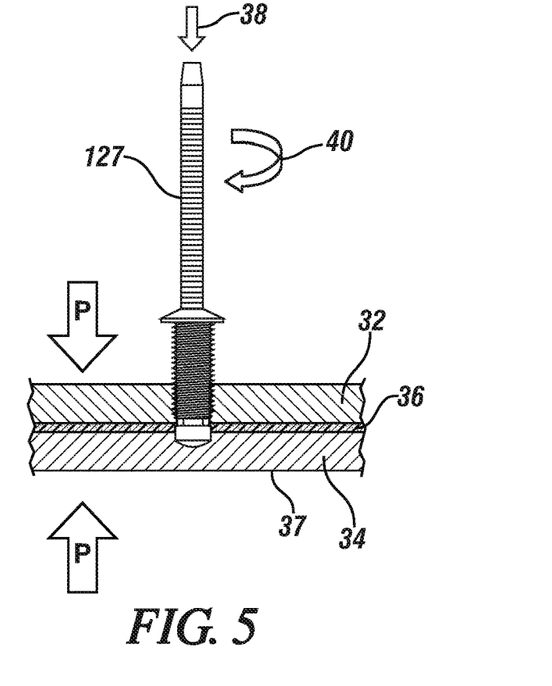
FIG. 5 illustrates a process of using the fastener of FIGS. 1, 2, and 3 to join together a workpiece stack consisting of two overlying members with adhesive applied at the faying interface.

Engagement of surface 129 of mandrel head 128 with surface 31 of workpiece 32 will result in frictional heating at joint zone 100. For materials such as non-ferrous alloys and polymers, including reinforced polymers, initially at about room temperature, or 20-25 degrees Celsius or so, such heating reduces their strength, making them less resistant to penetration and rendering them more flowable. Thus, continued advancement of fastener 110 into, initially, workpiece 32, and then optional adhesive 35, and finally workpiece 34, as shown at FIG. 5, may proceed with a lesser application of pressure along direction 38 than would have been required if the workpieces had remained at room temperature.

Figure 6:
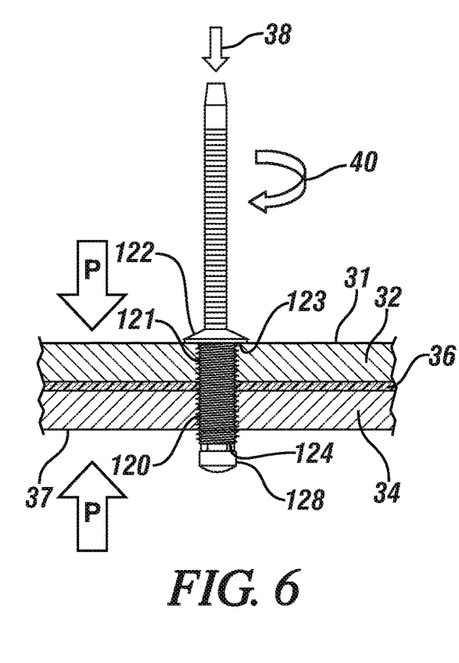
FIG. 6 illustrates a process of using the fastener of FIGS. 1, 2, and 3 to join together a workpiece stack consisting of two overlying members with adhesive applied at the faying interface.

In an embodiment, when the fastener initially encounters the workpiece stack surface 31, advancement is stopped temporarily and the fastener is rotated at high speed to maximize frictional heating, resulting in a dwell time. Then, the rate of rotation of the fastener is slowed and fastener advancement re-initiated so that the advancement and rotation of the fastener into the clamped-together workpieces is coordinated to replicate the pitch of thread 121. Thus, the fastener may be generally 'threaded' into the softened, flowable workpieces with some displaced workpiece material filling the screw thread 121 and any excess displaced material being ejected from the openings in the workpieces created by the advancing fastener On continued advancement, FIG. 6, fastener 110 penetrates the workpieces, bringing the undersurface 123 of annular cap 122 into engagement with surface 31 of workpiece 32 and causing mandrel head 128 and opposing end 124 of body 120 to penetrate and extend beyond surface 37 of workpiece 34 as shown at FIG. 6. Suitably the length of body 120 is selected to assure that the portion of body 120 extending below workpiece surface 37 ranges from 2-5 millimeters.

Figure 7:
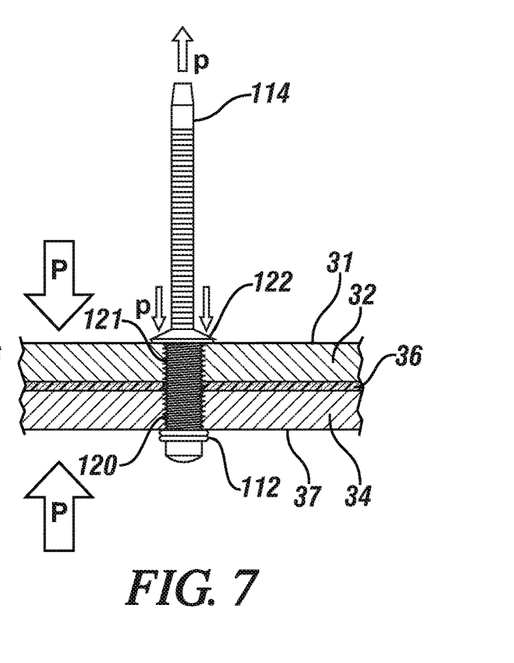
FIG. 7 illustrates a process of using the fastener of FIGS. 1, 2, and 3 to join together a workpiece stack consisting of two overlying members with adhesive applied at the faying interface.

After fastener 110 fully engages both workpieces as shown at FIG. 7, and, while continuing to maintain clamping pressure P on workpieces 32, 34, rotation 40 and advancement in direction of arrow 38 is discontinued and a tensile force 'p' is applied to the shaft 127 (FIGS. 4, 5) of fastener mandrel 114 and an opposing, reaction force 'p' is applied to annular cap 122. The force 'p' applied to mandrel 114, because of the interference between bore 16" and mandrel head 28" (FIG. 3), will initially splay and then collapse opposed body end 24" (FIG. 3) and that portion of body 120 extending below surface 37 (FIG. 6). The splayed and/or collapsed portion 112 of body 120 will now have a larger diameter than the original exposed end diameter and the like-sized hole in workpiece 34 occasioned by the penetration of opposing end 124 (FIG. 6). So, the collapsed portion 112 will interferingly engage surface 37 of workpiece 34 while annular head 122 interferingly engages surface 31 of workpiece 32 to securely join workpieces 32 and 34 together.

Figure 8:
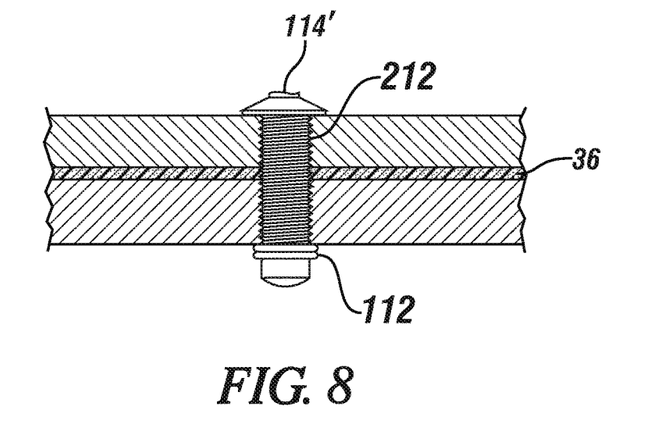
FIG. 8 illustrates a process of using the fastener of FIGS. 1, 2, and 3 to join together a workpiece stack consisting of two overlying members with adhesive applied at the faying interface.

On continued increase in the force 'p' (and the corresponding reaction force) the exposed workpiece end will continue to collapse and deform until mandrel shaft 126 fractures leaving remnant portion 114' of mandrel 114 engaged with the collapsed body portion 112 and the remaining, undeformed, body portion 212 (FIG. 8). If optional adhesive layer 36 is incorporated into the workpiece stack it may, if necessary, be cured to develop full joint strength.

In the embodiment illustrated at FIGS. 4-8, two workpieces were joined. In the described/illustrated process the nature and composition of the workpieces was not addressed. It will however be appreciated that any workpieces which appreciably soften at temperatures less than the softening temperature of the ferrous fastener may be joined by such a process. Non-ferrous alloys of aluminum and magnesium satisfy this requirement as do thermoplastic polymer-based workpieces, whether reinforced or not, so that any combination of workpieces of these compositions may suitably be joined using the described process. It will also be apparent that the process is not restricted to only two workpieces and that, with appropriate selection of the fastener body length a plurality of workpieces, with or without adhesive on their respective faying surfaces, may be joined together.

Figure 9:
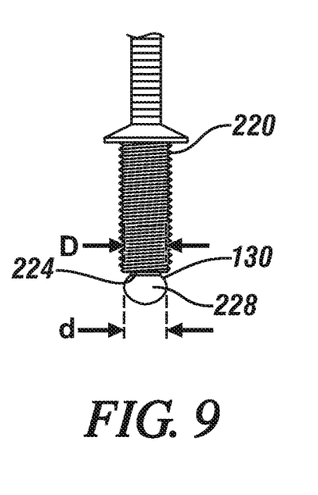
FIG. 9 illustrates an alternative mandrel head geometry.
Figure 10:
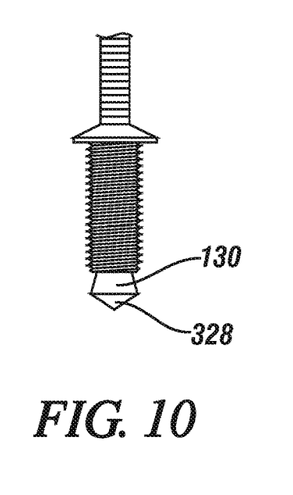
FIG. 10 illustrates another alternative mandrel head geometry.
Figure 11:
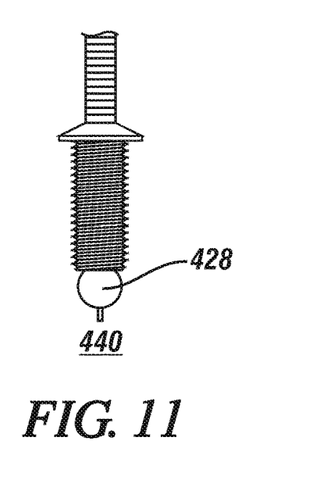
FIG. 11 illustrates yet another alternative mandrel head geometry.

Alternative mandrel head designs may be employed. Some additional, non-limiting, examples are shown at FIGS. 9, 10, and 11 and include an ellipsoid 228, a cone 328 and a sphere 428 with an outwardly-extending blade-like feature 440. These mandrel head designs may heat, soften, and displace workpiece material(s) or, in some instances may also cut and mechanically remove some of the workpiece material(s). For example, ellipsoid 228 and flat 29 (FIG. 1) will predominantly function to soften and displace material. The sphere-with-blade design shown at FIG. 11 will both cut and soften the workpiece material, with the rotating blade-like feature cutting a small central hole and the rotating sphere frictionally heating the remaining material. Geometric modifications may be made to these illustrated head design to modify their behavior. For example, the conical head 328 may be modified with flutes extending along the fastener axis to induce greater cutting action if desired. The choice of mandrel may be influenced by the workpiece material(s). For example, it may be preferred to use a mandrel head design which predominantly displaces, rather than cutting, material, for fiber reinforced composite materials to minimize any disruption of the reinforcing fibers.

Each of mandrel head designs 228 and 328 is shown transitioning to the mandrel shaft diameter via a tapered feature 130 which engages the body bore and enables generally uniform expansion of the body as the mandrel is withdrawn. Alternatively, the geometry of the head may be such that a gradual engagement of the head with the bore will naturally result, for example the sphere 428 shown at FIG. 11, so that no taper need be introduced at the junction of the mandrel head and mandrel shaft.

For appropriate fastener performance, diameter 'd' (FIG. 9) of the mandrel head may be equal to or smaller than the minor diameter 'D' of the thread at the opposing end 224. (Generally, the mandrel head will be symmetrical about the axis of rotation of the fastener and so the region of mandrel head workpiece contact will be circular and may be characterized by a diameter 'd'.) This assures that the resulting cylindrical cavity remaining after material may be displaced or removed during penetration of the rotating fastener will have a diameter equal to or less than the minor thread diameter on the fastener body diameter. Thus, at least some of the displaced, heated and softened material may be 'packed' into the threads on continued advance of the fastener, or the fastener may be threaded into the workpiece stack. On cooling, the now-stronger, previously-softened, material will engage the fastener body to enhance joint strength. Generally, the ratio of diameters d/D may range from 0.7 to 1.

Figure 12:
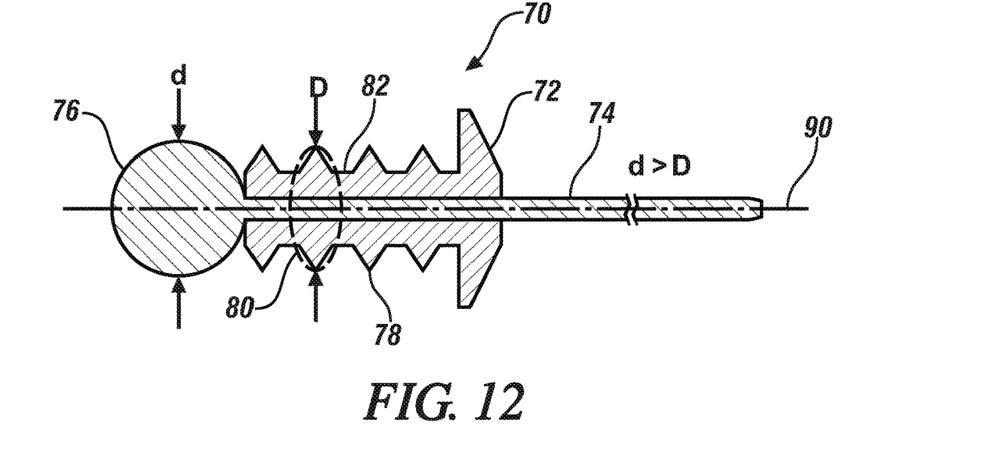
FIG. 12 illustrates a representative embodiment of a second aspect of a fastener in which the fastener body incorporates externally-extending ridges.
Figure 13:
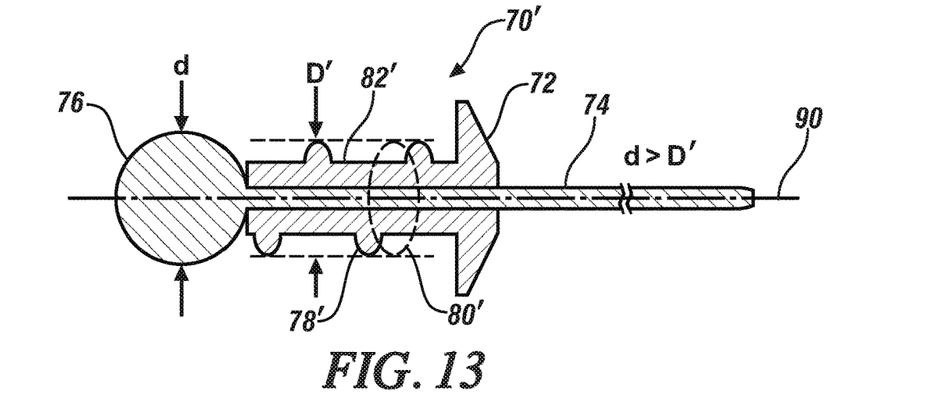
FIG. 13 illustrates a representative embodiment of a second aspect of a fastener in which the fastener body incorporates commonly dimensioned, commonly-shaped protuberances.
Figure 14:
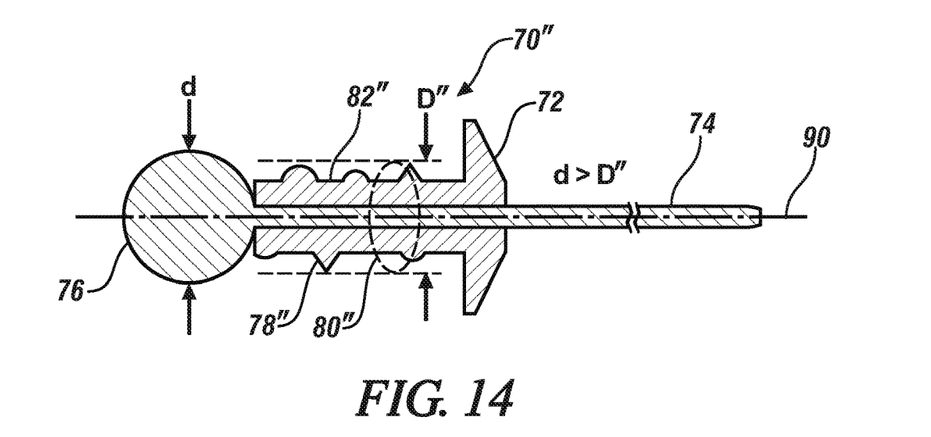
FIG. 14 illustrates a representative embodiment of a second aspect of a fastener in which the fastener body incorporates variably shaped protuberances.

Similar practices regarding rotation and advancement of the fastener may be followed when using the fasteners with more irregular workpiece-engaging features such as those shown on fasteners 70, 70', 70" shown at FIGS. 12, 13, and 14. Each of these fasteners incorporates outwardly-extending protuberant features, 78, 78', 78" on body 82. The protuberant features may be continuous and extend in a continuous band around the body circumference or local, occurring as isolated, spaced-apart features. The protuberances may be present in varying numbers, shapes and size. For example, at FIG. 12 protuberant features 78 are sharp, pointed, ridges, which are analogous to the thread-like features discussed above, may be continuous or segmented, and may be, as shown, uniformly dimensioned; at FIG. 13 the protuberant features 78' are uniformly-sized, isolated and round-topped, generally resembling hillocks; and, at FIG. 14 a plurality of protuberant features 78" of varying shapes and sizes are shown. In these fasteners, however, the dimension d, the maximum dimension of mandrel head 76, is greater than the diameters D, D', D" corresponding to the diameters of the circumscribing circles 80, 80', 80", centered on fastener rotational axis 90. In some instances, it may be appropriate to employ only a single protuberance, rather than the plurality of protuberances illustrated.

As fasteners 70, 70', 70" are rotated and advanced into a workpiece stack, as described above, the size of the hole in the workpieces created by the rubbing action of mandrel head 76 will be larger than is required to accommodate fastener bodies 82, 82', 82". Thus, the rate of advance of the fastener into the workpieces need not be cooperatively determined by the need for the protuberances to engage the softened material. Rather the fastener may be advanced into the workpieces at any desired rate, subject only to machine limitations on applied load and rate of advance. Once fully inserted, that is, with the underside of cap 72 contacting the upper surface of the uppermost workpiece, mandrel 74 may be retracted and fractured as described previously to expand and compact fastener body 82 and drive protuberances 78, 78', 78" into engagement with the walls of the just-formed hole in the workpiece stack. If ratios d/D, d/D', d/D" shown at FIGS. 12, 13, and 14 respectively are in the range 1.02-1.05, the degree of deformation applied to fastener body 82 by mandrel 74 is minimized, assuring good engagement of the fastener body with the workpieces, but higher ratios, up to 1.2 may also provide acceptable holding power.

In this aspect, the retraction of mandrel 74 may be tightly coordinated or synchronized with attainment of full fastener penetration into the workpiece stack and the cessation of fastener rotation. This will enable the deformation of fastener body 82 to occur while the region surrounding the hole in the workpieces is still at elevated temperature, reducing the load required drive protuberances 78, 78', 78" into engagement with the workpiece stack. It may be expedient to employ high speed rotation and a limited rate of advance of the fastener to expand, by conduction, the extent of the workpiece stack heated region to further facilitate engagement of the protuberances with the workpiece stack. It will be appreciated that the full range of mandrel head designs shown and described may not be appropriate in this aspect and that only mandrel head designs which emphasize rubbing, rather than cutting, may be best suited for this aspect.

Figure 15:
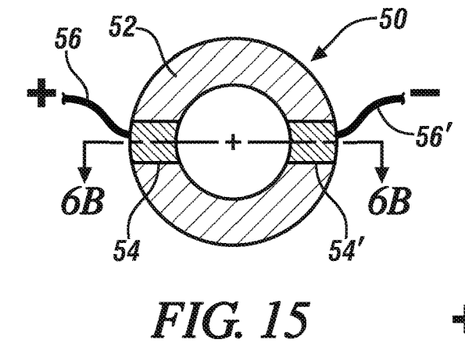
FIG. 15 shows, in plan view, a heating and clamping device for implementing a further embodiment for joining together a workpiece stack consisting of two overlying members with adhesive applied at the faying interface.
Figure 16:
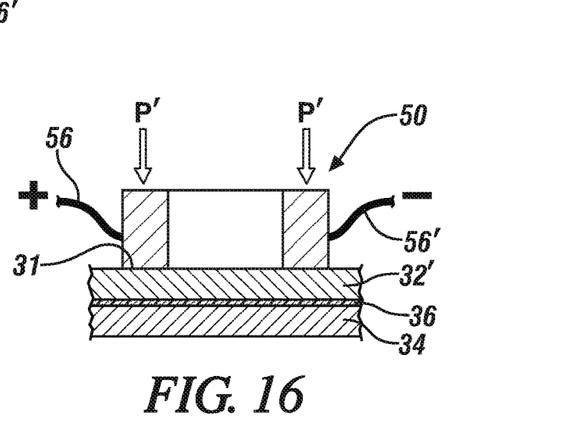
FIG. 16 shows, in sectional view, a heating and clamping device for implementing a further embodiment for joining together a workpiece stack consisting of two overlying members with adhesive applied at the faying interface.

In a further embodiment, applicable to both aspects, the upper workpiece may be heated externally. Such heating is supplementary to frictional heating and serves to reduce the cycle time for fastener insertion by reducing the extent of frictional heating and so reducing the dwell time or the period during which the rotating mandrel head is maintained at a fixed position in frictional interference with the workpiece surface generating heat. In an aspect, suitable for use on metallic or electrically conductive workpieces, a combination clamp/conductor 50 comprising an annular electrically non-conductive body 52 incorporating two independent electrically conducting segments 54, 54' is shown in plan view at FIG. 15 and in sectional view at FIG. 16. As shown at FIG. 16 clamp/conductor 50 applies pressure to surface 31 of workpiece 32' (opposing clamp or support not shown), an electrically-conductive workpiece, which is positioned atop workpiece 34 and, optionally adhesive 36 positioned between workpieces 32' and 34. Electrical leads 56, 56' are connected to conductors 54, 54' respectively. As illustrated, DC power is provided with each of leads 56 and 56' being connected to an electrical source (not shown) and having opposing polarities, but AC power would serve equally well.

Figure 17:
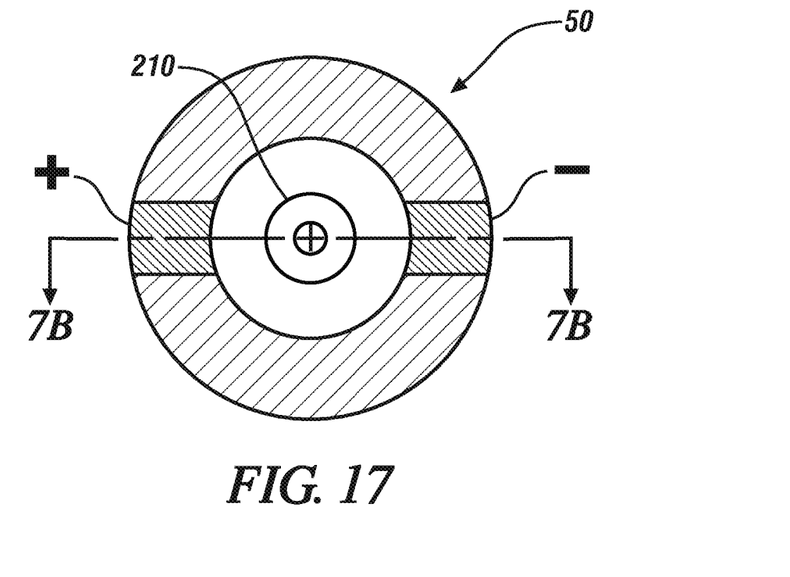
FIG. 17 shows, in plan view a heating and clamping device for implementing a further embodiment for joining together a workpiece stack consisting of two overlying members with adhesive applied at the faying interface and illustrating the operation of a heating and clamping device.
Figure 18:
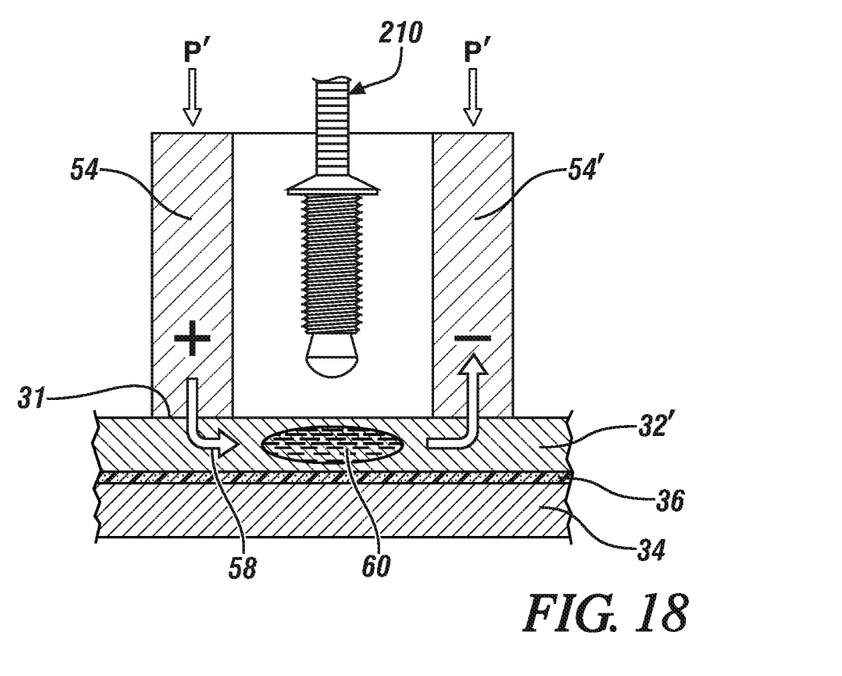
FIG. 18 shows, in sectional view, a heating and clamping device for implementing a further embodiment for joining together a workpiece stack consisting of two overlying members with adhesive applied at the faying interface and illustrating the operation of a heating and clamping device.

In operation, as shown in plan view at FIG. 17 and in sectional view at FIG. 18, current 58 passes from electrode 54, through workpiece 32' to electrode 54', and, as it does so, induces resistance heating in a region 60 in workpiece 32'. Thus, when fastener 210, positioned with its axis generally collinear with the axis of annular clamp/conductor 50 is advanced into the workpieces in the manner shown at FIGS. 4-8 it will encounter heated, softened region 60 and so require less frictional heating for penetrating and extending through the workpieces.

The specific example shown is exemplary only and representative of only mode of external heating. As further examples, induction heating, using an annular pancake coil centered on the fastener axis may also be suitable for conductive workpieces and laser heating, using an externally-located laser focused on the joint zone may be applicable to a wide range of workpieces including non-electrically conductive workpieces such as polymer-based workpieces. If necessary, the efficiency of such a laser-based heating system may be enhanced by applying an absorption-enhancing coating to the workpiece.

The above description of exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A fastener for forming a structural joint between two or more layered workpieces, the fastener comprising:
    a hollow, elongated body with an axis of rotation, a length, first and second opposing ends, a bore having an internal surface, and an external surface, the body terminating at the first end in an annular cap with an outer diameter,
    the external surface of the body having a thread that extends outwardly in a radial direction, the thread being circumscribable by a circle, centered on the axis of rotation of the body, the circumscribing circle having a diameter less than the outer diameter of the annular cap, the thread further having a pitch, a major diameter, and a minor diameter, the major diameter of the thread defining the diameter of the circumscribable circle, and
    a mandrel with a shaft terminating in a head, the mandrel extending along the axis of rotation of the body, the shaft slidably engaging the body internal surface and the head being positioned external to the body at the second end, the mandrel having a length greater than the body length, the head of the mandrel being sized to interferingly engage the second end of the body and including an end having a first contact portion that is aligned on the axis of rotation of the body, wherein the end of the head of the mandrel is cone-shaped and includes an outer surface that is tapered so as to form a point that constitutes the first contact portion, and wherein the head of the mandrel is characterized by a diameter greater than the diameter of the circumscribing circle.

2. The fastener of claim 1 in which the thread pitch is uniform.

3. The fastener of claim 1 in which the head of the mandrel additionally incorporates features adapted for cutting the workpieces.

4. The fastener of claim 1 in which the thread is continuous or local.

5. The fastener of claim 1 in which the thread is displaced outwardly from the axis of rotation of the body when the head of the mandrel is forcibly pressed into interfering engagement with the body.

6. The fastener of claim 1 in which a ratio of the diameter of the head of the mandrel to the diameter of the circumscribing circle is less than or equal to 1.2.

7. The fastener of claim 1 in which a ratio of the diameter of the head of the mandrel to the diameter of the circumscribing circle is between 1.02 and 1.05.

\* \* \* \* \*